United States Patent [19]

Sakoda et al.

[11] 3,860,808

[45] Jan. 14, 1975

[54] ELECTRONIC COMPUTER SYSTEM

[75] Inventors: Shunsuke Sakoda; Yoshinori Tanaka, both of Kanagawa-ken, Japan

[73] Assignee: Sony Corporation, Tokyo, Japan

[22] Filed: May 7, 1973

[21] Appl. No.: 357,676

[30] Foreign Application Priority Data

May 9, 1972 Japan .............................. 47-45647
May 9, 1972 Japan .............................. 47-45648

[52] U.S. Cl. .............................................. 235/156
[51] Int. Cl. ............................................ G06f 7/38
[58] Field of Search .................... 235/156, 152, 160

[56] References Cited

UNITED STATES PATENTS

| | | | |
|---|---|---|---|
| 3,312,951 | 4/1967 | Hertz | 235/156 X |
| 3,346,851 | 10/1967 | Thornton et al. | 235/156 X |
| 3,402,285 | 9/1968 | Wang | 235/156 X |
| 3,405,392 | 10/1968 | Milne et al. | 235/156 X |
| 3,760,171 | 9/1973 | Wang et al. | 235/156 |

*Primary Examiner*—Charles E. Atkinson
*Attorney, Agent, or Firm*—Lewis H. Eslinger; Alvin Sinderbrand

[57] ABSTRACT

An electronic computer system having a main functional unit and a plurality of sub-functional units, such as a memory unit, a function generator unit, etc., with all of the functional units being supplied with a key code signal from a single keyboard unit through a common key code bus line. All of the functional units give instruction signals to an arithmetic unit through a common instruction bus line.

7 Claims, 5 Drawing Figures

ELECTRONIC COMPUTER SYSTEM

BACKGROUND OF THE INVENTION

The invention relates generally to electronic computer systems and more particularly to the type of electronic computer system in which a plurality of functional and sub-functional units are operated by a single keyboard unit.

Many different kinds of electronic computers, such as desk top electronic calculators and the like, have recently become popular in which a main functional unit and a plurality of sub-functional units such as memory units, a function generator unit, etc., are utilized. In these conventional electronic computers only the main functional unit is of a complex construction and the sub-functional units are of a relatively simple construction. In such circuits typically the functional units, when in the form of an integrated circuit, are all made on a single semiconductor wafer. While such single wafer construction is normally convenient and easy to manufacture it has the disadvantage that it makes changes to the system expensive and difficult. Even if only a small change is required in the group of the original sub-functional units a new circuit must be designed and a new integrated circuit wafer must be manufactured. This is a relatively expensive process.

Although this difficulty results chiefly from the fact that in conventional electronic computer systems the main functional unit and the plurality of sub-functional units are formed on a single semiconductor wafer, a secondary factor is that the main functional unit is made overly complex so that it can control all of the relatively simplified sub-functional units.

SUMMARY OF THE INVENTION

The above and other disadvantages are overcome by the electronic computer system of the present invention which comprises a plurality of functional units, a keyboard unit for generating a key code signal including an information signal to a select one of the functional units, a common key code bus line for receiving the key code signal from the keyboard unit and for distributing the same to each of the functional units, key code interpretation means included in each of the functional units for receiving and interpreting the key code signal, key code suppression signal generating means included in each of the functional units, the key code suppression signal generating means of one of the functional units generating a key code suppression signal when the key code interpretation means of the one of the functional units makes the interpretation of the key code signal that the one functional unit is to receive a succeeding key code signal, and a key code suppression bus line connected in common to each of the key code suppression signal generating means for receiving the key code suppression signal from the one functional unit and for supplying the same to the rest of the functional units to bar them from receiving the succeeding key code signal.

In some preferred embodiments one of the plurality of functional units is a main functional unit and another of the plurality of functional units is a memory unit. The plurality of functional units are made in the form of integrated circuits on separate semiconductor wafers.

Each of the sub-functional units is made nearly identical to the main functional unit in construction and is also made relatively complicated as compared with sub-functional units or prior art systems.

A single arithmetic unit is provided in the system and an instruction signal is supplied to the arithmetic unit from each of the functional units through a common instruction bus line. An instruction suppression signal generating means is also provided in each of the functional units and when one of the functional units "occupies" the arithmetic unit for an arithmetic operation, an instruction suppression signal is generated in the instruction suppression signal generating means of one of the functional units and this suppression signal is supplied to the other functional units through a common bus line to prevent them from occupying the arithmetic unit.

A common data bus line is further provided and is connected between the arithmetic unit and each of the functional units. A data signal is supplied and taken between the arithmetic unit and each of the functional units through the common data bus line.

With the electronic computer system constructed according to the present invention a manufacturer can easily make the changes in the system and add new sub-functional units to the original system merely by making a new mask pattern of the particular new sub-functional unit to be supplied. The new unit is then connected to the original system through the above-mentioned key code bus line, instruction bus line, data bus line, etc., without the necessity of changing the original system.

This ability to easily add new sub-functional units in the form of integrated circuits adds flexibility to the system because it makes it possible to connect the main functional unit with different combinations of sub-functional units so that the system may be easily adapted for use with different kinds of electronic computer systems.

Accordingly, it is one object of the invention to provide an improved electronic computer system which allows for flexibility in the system design by providing a system in which different sub-functional units may be made separately in the form of integrated circuits.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
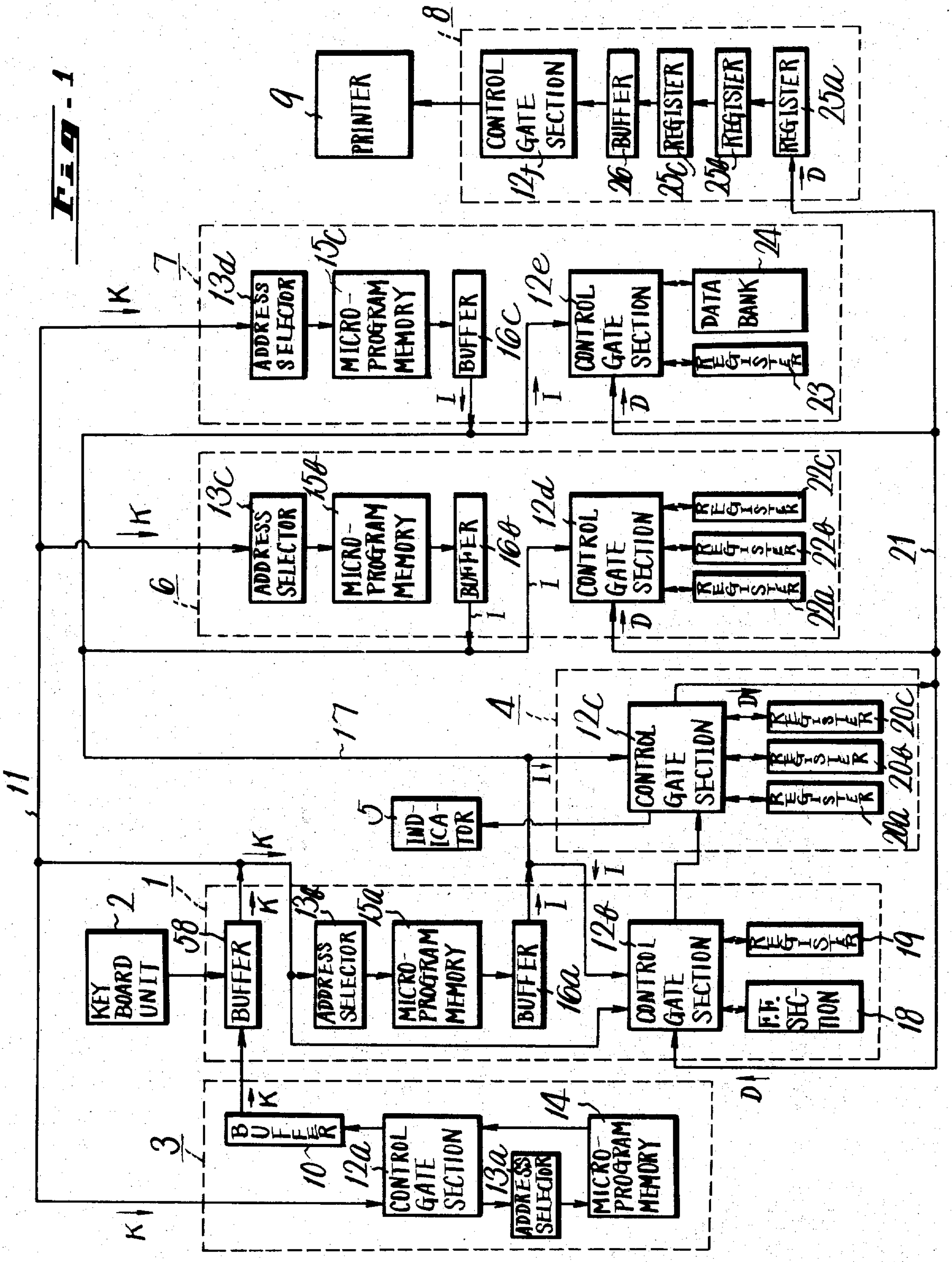
FIG. 1 is a block diagram of one embodiment of a computer system according to the invention.

Referring now more particularly to FIG. 1 a computer system according to the invention is comprised of a main functional unit 1, a keyboard unit 2, a program unit 3, a main arithmetic unit 4, an indicator such as an indication tube 5, a memory unit 6, a function generator unit 7 which may provide a specially fixed program such as square root, sine, cosine, and tangent functions and the like, and a printer control unit 8 for controlling a printer 9.

Figure 2:
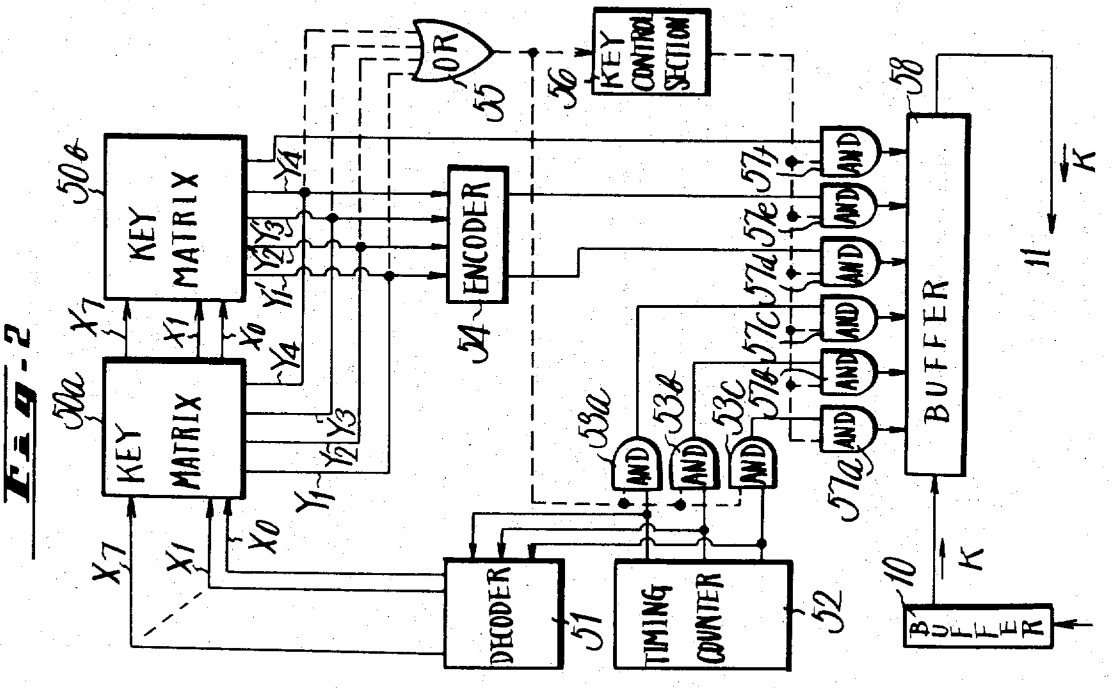
FIG. 2 is a block diagram of the keyboard unit for use in the embodiment of FIG. 1.

In FIG. 2 the construction of the keyboard unit 2 is shown in greater detail in which references 50*a* and 50*b* indicate key matrices which together have eight common drive lines $X_0, X_1 \ldots X_7$ and four read lines apiece, namely $Y_1, Y_2, Y_3, Y_4$ and $Y'_1, Y'_2, Y'_3$ and $Y'_4$, respectively, arranged in a matrix. The drive lines $X_0, X_1 \ldots X_7$ are repeatedly and sequentially supplied with drive pulses from a decoder 51. The drive pulses are sequentially different in phase. The decoder 51 generates the drive pulses with the predetermined phase differences in response to separate outputs from a timing counter 52. The separate outputs from the timing counter are also fed to separate inputs of AND gates 53*a*, 53*b* and 53*c*. The read line pairs $Y_1$ and $Y'_1$, $Y_2$ and $Y'_2$, $Y_3$ and $Y'_3$, $Y_4$ and $Y'_4$ of the key matrices 50*a* and 50*b* are connected together in pairs and the pairs are then connected to separate inputs of an encoder 54 which selectively provides two-bit, binary coded signals. The binary coded signals from the encoder 54 are obtained in correspondence to the signals on the read lines $Y_1, Y'_1$; $Y_2, Y'_2$; $Y_3, Y'_3$ and $Y_4, Y'_4$, respectively.

Drive pulses appear on the read lines with the predetermined phase differences in accordance with keys (not shown) which are pushed down by the operator. The drive pulses delivered to the read lines are fed through separate inputs to an OR gate 55 whose output is connected to a key control section 56 and to the other inputs to the AND gates 53*a*, 53*b* and 53*c*, respectively. The outputs from the AND gates 53*a*, 53*b* and 53*c* are fed to separate inputs of AND gates 57*c*, 57*b* and 57*a*, respectively. The binary-coded signal from the encoder 54 is fed to separate inputs to AND gates 57*d* and 57*e*, respectively. One input to an AND gate 57*f* is supplied with the bit signal from the key matrix 50*b* which may indicate that a key has been operated in either of the key matrices 50*a* or 50*b*. The other inputs to the six AND gates 57*a* to 57*f* are supplied with a gate signal from the output of the key control section 56.

With this gate signal even if a key is held down in one of the key matrices 50*a* or 50*b* or if more than one key is pushed down at the same time, a key code signal is properly controlled by the AND gates 57*a*–57*f* to be set into a buffer 58 connected to the outputs of the AND gates 57*a* to 57*f*. In the keyboard unit 2 as described above a six bit key code signal is produced in correspondence with each operated key.

In certain circumstances the buffer 58 may be supplied with a key code signal K from a buffer 10 in the program unit 3. The key code signal K is also supplied from the buffer unit 58 to a common line 11 which is hereinafter referred to as a key code bus line. Referring again to FIG. 1, the key code signal K received in the program unit 3 through the key code bus line is applied through a control gate section 12*a* to an address selector 13*a* and thence to a microprogram memory unit 14. The output from the memory unit 14 is fed back through the control gate section 12*a* to the first buffer 10, to the second buffer 58 and thence to the key code bus line 11.

The key code signal K received by the main functional unit 1 through the key code bus line 11 is fed through an address selector unit 13*b* to a second microprogram memory unit 15*a*. An instruction signal produced by the microprogram memory unit 15*a* is delivered through a buffer 16*a* to a common line 17, which will hereinafter be referred to as an instruction bus line. An instruction signal I is received by the main functional unit 1 through the instruction bus line 17 and is fed to a control gate section 12*b*. The control gate section 12*b* is provided with a flip-flop section 18 and a data register 19 so as to detect the polarity of the results of an arithmetic operation and to detect whether a decimal-point key is pushed down or not. The control gate section 12*b* is also supplied with the key code signal K from the key bus line 11 and with a data signal D from a data bus line 21.

The instruction signal I received by the main arithmetic unit 4 through the instruction bus line 17 is fed to a control gate section 12*c* which is provided with separate registers 20*a*, 20*b* and 20*c*. The control gate section 12*c* is also supplied with an output data signal from the control gate section 12*b* of the main functional unit 1. An output data signal from the control gate section 12*c* is supplied to the data bus line 21. The control gate section 12*c* also supplies an output signal to the indicator 5.

The memory unit 6 and the function generator unit 7 have substantially the same construction as the main functional unit 1. The memory unit 6 is comprised of an address selector 13*c* which is supplied with a key code signal K from key bus line 11 and which delivers an output to a microprogram memory unit 15*b*. The output from the microprogram memory unit 15*b* is supplied to a buffer 16*b* which delivers an instruction signal I to the instruction bus line 17. The instruction bus line 17 is also connected to the input of a control gate section 12*d* which is provided with separate registers 22*a*, 22*b* and 22*c*. The control gate section is also supplied with the data code signal D from the data bus line 21.

Similarly, the function generator unit 7 is comprised of an address selector unit 13*d* which is supplied with the key code signal K from the key bus line 11 and which supplies an output signal to a microprogram memory unit 15*c*. The output from the microprogram memory unit 15*c* is supplied to a buffer 16*c* which in turn supplies an instruction signal I to the instruction bus line 17. The instruction bus line 17 is connected to the input of a control gate section 12*e* which is provided with a register 23 and a data bank 24. The control gate section 12*e* is also supplied with a data code signal D from the data bus line 21.

The printer control unit 8 is comprised of a first register 25*a* which is supplied with the data code signal D and whose output is connected in series through registers 25*b* and 25*c* and a buffer 26 to a control gate section 12*f* whose output operates the printer 9.

The above-mentioned functional units 1 and the subfunctional units, such as program unit 3, arithmetic unit 4, memory unit 6, function generator unit 7, and printer control unit 8 are formed on separate semiconductor wafers as integrated circuits. The keyboard unit 2 is used commonly for the respective units. A key code signal K from the keyboard unit 2 is first delivered to the key code bus line 11 through the buffer 58 and then to the respective sub-functional units which require the signal. The instruction signal I is given to the arithmetic unit 4 through the instruction bus line 17 from the main functional unit 1, the memory unit 6 and the function generator unit 7 while the data code signal D is both given and taken via the data bus line 21 between the main arithmetic unit and the functional unit 1, the memory unit 6, the function generator 7 and the printer control unit 8.

Figure 3:
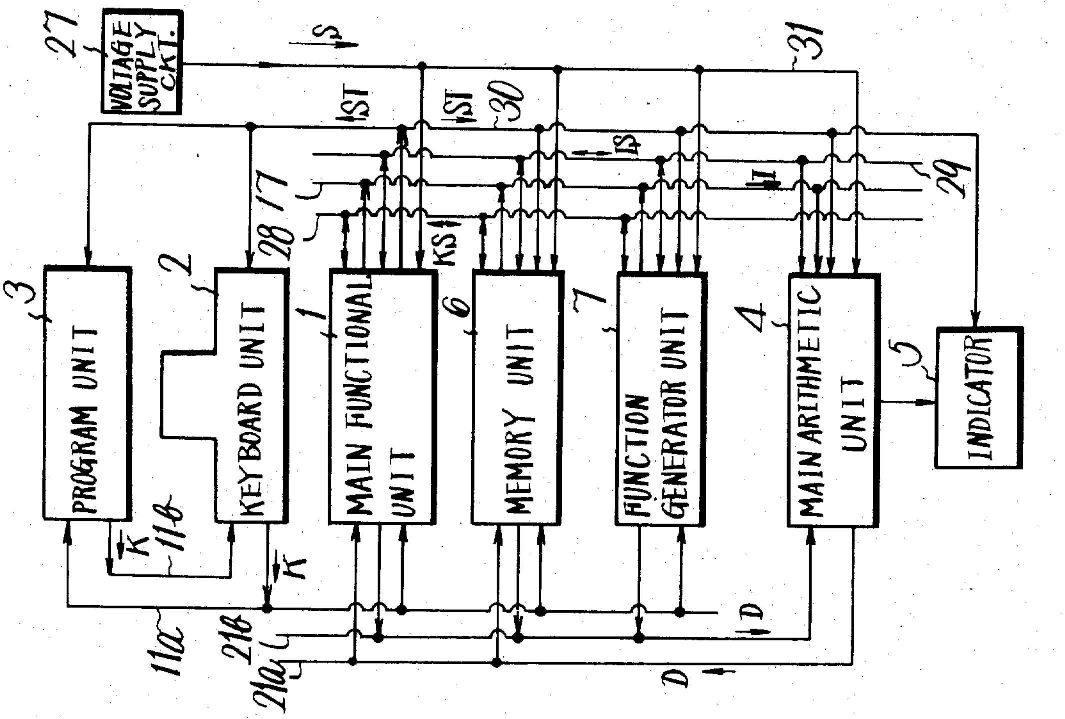
FIG. 3 is a simplified block diagram of the embodiment of FIG. 1.

In terms of its operation the embodiment of FIG. 1 can be rearranged as shown in FIG. 3 in which the printer control unit 8 is omitted for purposes of simplifying the explanation. Reference numeral 27 indicates a voltage supply circuit. A "start" instruction signal S is generated in the circuit 27 when the circuit is initially turned on. When the "start" instruction signal S is delivered to a "start " instruction bus line 31 which is connected to the main function unit 1, the main arithmetic unit 4, the memory unit 6 and the function generator unit 7, their initial conditions are established. A first one of the key code bus lines 11, key code bus line 11*a*, is supplied with the key code signal K produced by the keyboard unit 2. Another key code bus line 11*b* feeds the key code signal K from outside of the circuit, for example, from the program unit 3 to the key code bus line 11*a* through the keyboard unit 2.

A key code suppression bus line 28 is supplied with a key code suppression signal KS to make the key code signal ineffective for a designated functional unit. An instruction control bus line 29, which is related to the instruction bus line 17, is supplied with an instruction suppression signal IS for making the instruction signal I ineffective for an appointed functional unit. References 21*a* and 21*b* are data bus lines through which the data code signals D are given and taken between the arithmetic unit 4 and the main functional unit 1, the memory unit 6 and the function generator unit 7, respectively.

A "stop" instruction signal ST is fed from the main functional unit 1 through a line 30 to the keyboard unit 2, the program unit 3, the memory unit 6, the function generator unit 7, the main arithmetic unit 4 and the indicator 5, respectively.

Figure 4:
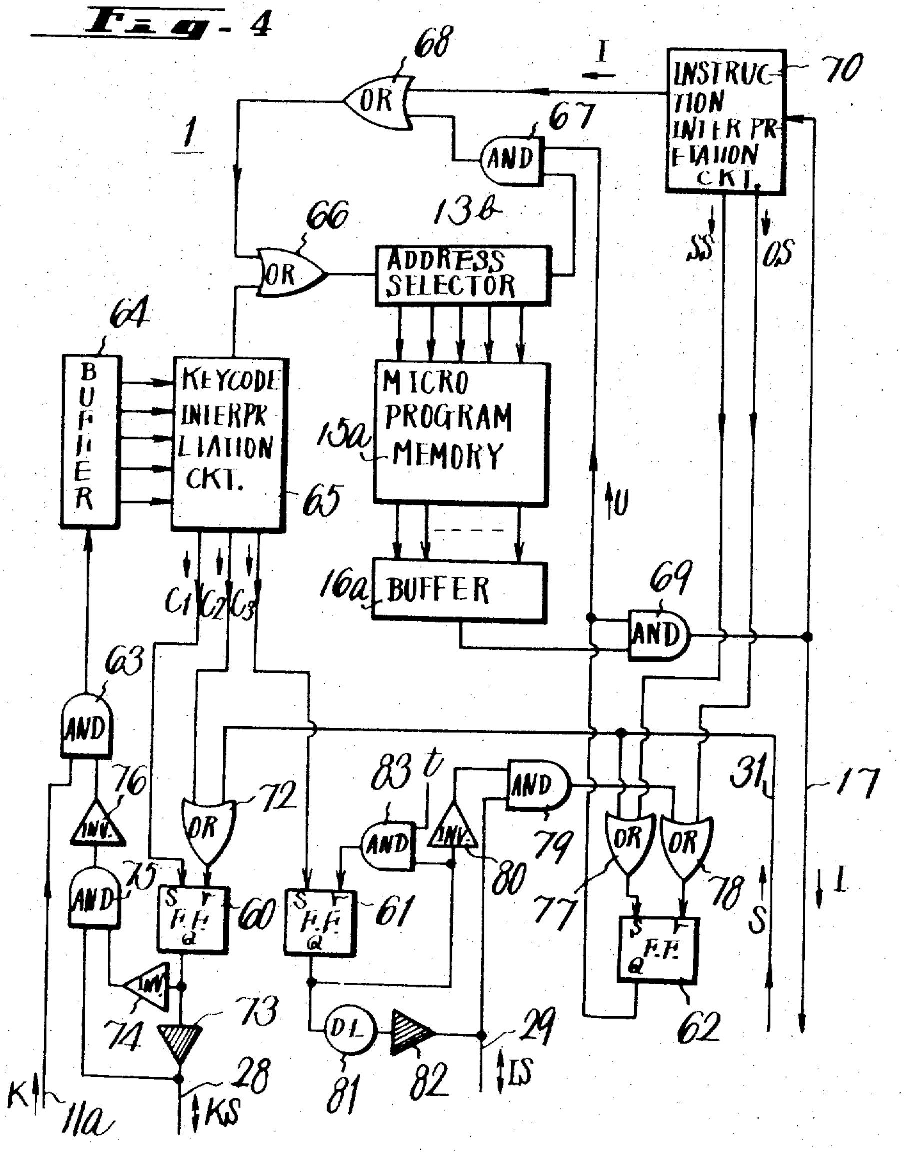
FIG. 4 is a block diagram of certain essential parts of the main functional unit of the embodiment of FIG. 1.
Figure 5:
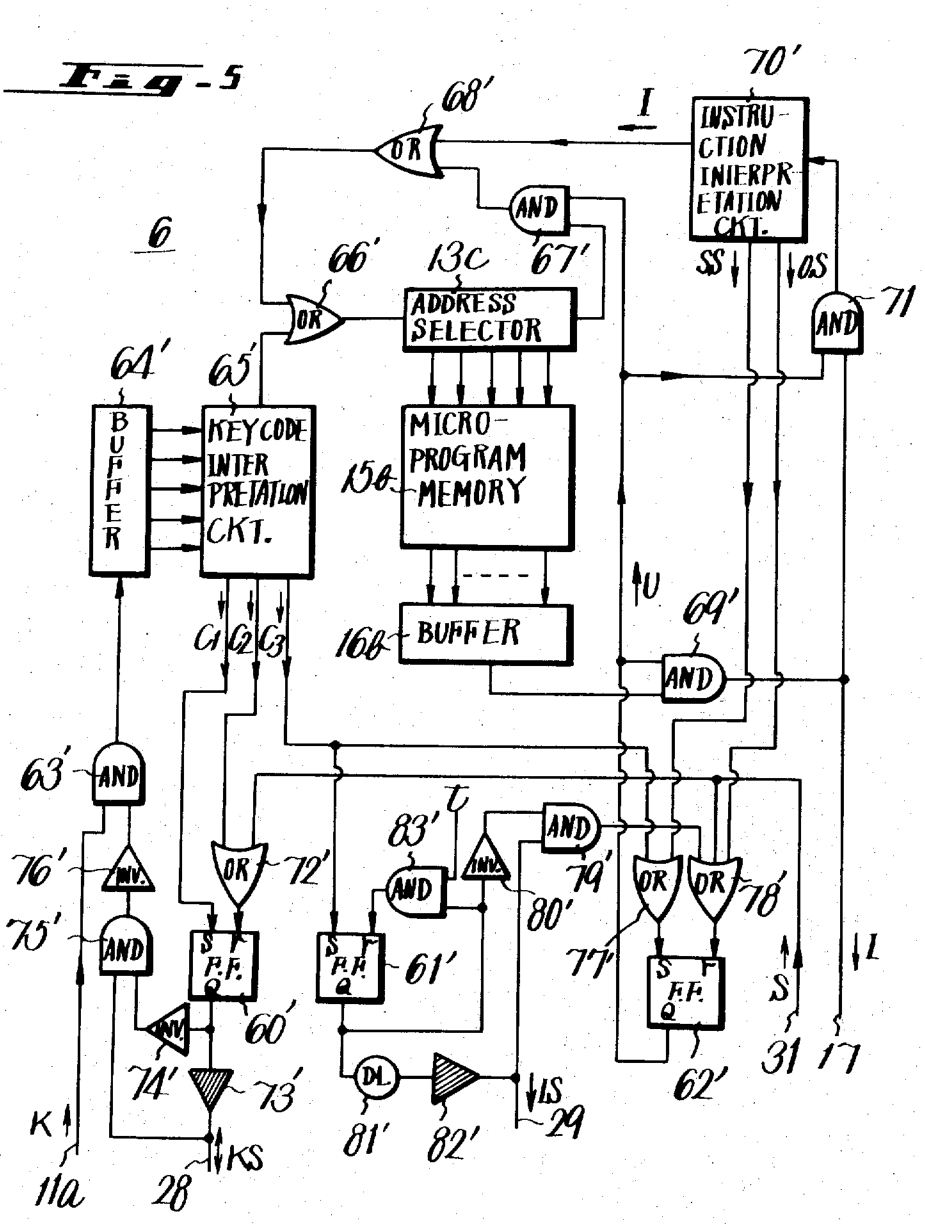
FIG. 5 is a block diagram of certain essential parts of the memory unit of the embodiment of FIG. 1.

Referring now more particularly to FIGS. 4 and 5 the main functional unit 1 and the sub-functional memory unit 6 are illustrated. In both of the figures the units for carrying out the delivery or receipt of the data signal are omitted for the sake of simplicity of explanation. Since the two units are constructed in substantially the same manner with the exception of the parts that control the set or the reset of their respective flip-flops 62 and 62′, the parts of the embodiment of FIG. 5 corresponding to those of FIG. 4 are designated with the same reference numerals primed and the description will be given primarily with respect to FIG. 4.

The key code signal K transmitted through the first key code bus line 11*a* is applied to one input of an AND gate 63 whose output is connected to a buffer 64. The gated key code signal K from the buffer 64 is fed to a key code interpretation circuit 65. The contents of the key code interpretation circuit 65 are applied to one input of an OR gate 66 whose output is connected to the address selector or register 13*b*. The contents of the register 13*b* are applied to one input of an AND gate 67 whose output is applied to one input of an OR gate 68 whose output is, in turn, applied to the other input of the OR gate 66, to thereby circulate the contents of the register 13*b*.

The key code interpretation circuit 65 produces control signals relating to the delivery or receipt of the key code signal. These control signals are a key code demand signal $C_1$, a key code refusal signal $C_2$ and a key code receipt signal $C_3$. The key code demand signal $C_1$ is produced when the key code interpretation circuit 65 makes the interpretation of the key code signal K that the functional unit 1 is to receive the succeeding key code signal. The key code refusal signal $C_2$ is produced when the circuit 65 makes the interpretation of the key code signal K that the functional unit 1 is not to receive the succeeding key code signals. The key code receipt signal $C_3$ is generated when the key code interpretation circuit 65 interprets the key code signal K as being for the functional unit 1.

Under the control of the address register 13*b* the microprogram memory 15*a* produces an instruction read out which is sent to the buffer 16*a*. The contents of the buffer 16*a* are applied to one input of an AND gate 69 whose output is connected to the instruction bus line 17. The bus line 17 is applied to an instruction interpretation circuit 70. In the case of the memory unit 6 shown in FIG. 5, however, the instruction on the bus line 17 is applied to one input of an AND gate 71 whose output is connected to an instruction interpretation circuit 70′. The purpose of the AND gate 71 is so that the instruction for the main functional unit 1 is interpreted only by the main functional unit 1 and instructions for the sub-functional unit 6 are interpreted not only by the unit 6 but also by other sub-functional units such as the function generator unit 7 and the like.

Referring again to FIG. 4 the instruction interpretation circuit 70 supplies an instruction signal I to the other input of the OR gate 68 so that the signal I is applied to the address register 13*b*. The instruction interpretation circuit 70 simultaneously produces a self-selection signal SS when an instruction is for the functional unit 1 itself and a unit selection signal OS when the instruction is for one of the other sub-functional units. A reset signal is supplied to a flip-flop 60 from the output of an OR gate 72. One input to the OR gate 72 is the key code refusal signal $C_2$ and another input to the OR gate 72 is the instruction signal S from line 31. The flip-flop 60 is set by the key code demand signal $C_1$.

The output from the flip-flop 60 is delivered through a unidirectional amplifier 73 to the key code suppression bus line 28. The output of the flip-flop 60 is also supplied through an inverter 74 to one input of an AND gate 75. The output from the amplifier 73 is also supplied to the other input of the AND gate 75. The output from the AND gate 75 is supplied through an inverter 76 to the other input of the AND gate 63. Thus if the flip-flop unit 60 is set, the AND gate 63 is open to be ready to receive the next succeeding key code signal in the main functional unit 1 while the key code suppression signal KS is simultaneously delivered to the key code suppression bus line 28 to control the other sub-functional units in such a manner that they cannot receive the succeeding key code signal unless they demand the succeeding key code signal.

The set input of a flip-flop 62 is supplied from the output of an OR gate 77, one of whose inputs is the instruction signal S on the line 31 and the other of whose inputs is the self-selection signal SS from the instruction interpretation circuit 70. The flip-flop 62 is reset by the output from an OR gate 78, one of whose inputs is supplied by the other unit selection signal OS from the circuit 70 and the other of whose inputs is supplied from the output of an AND gate 79. The output from the flip-flop 62 is supplied to the other inputs of the AND gates 67 and 69 as a unit operation signal U.

In FIG. 5, the flip-flop 62' of the memory unit 6 is set by the self-selection signal SS or by the key code receipt signal $C_3$ passed through the OR gate 77' and is reset either by the "start" instruction signal S from the line 31, the other unit selection signal OS or the output signal from the AND gate 79' through a triple input OR gate 78'. The output from the flip-flop 62' is supplied as a unit operation signal U to the other inputs of the AND gates 67', 69' and 71.

Referring again to FIG. 4 the key code receipt signal $C_3$ sets a flip-flop 61. The reset signal to the flip-flop 61 is supplied by the output of an AND gate 83. The output from the flip-flop 61 is supplied to one input of the AND gate 83, through an inverter 80 to one input of the AND gate 79 and to the insruction control bus line 29 through a delay circuit 81 and a unidirectional amplifier 82. The signal supplied to the instruction control bus line 29 is an instruction suppression signal IS which is fed to the other input of the AND gate 79. The flip-flop 61 is reset by its own output signal in synchronism with a proper timing signal *t* by means of the AND gate 83. When the functional unit 1 determines that a received key code signal K is for the functional unit 1, the flip-flop 61 is set to deliver the instruction suppression signal IS to the instruction control bus line 29. The flip-flop 61 is reset by the timing signal *t* after a predetermined time interval.

A description will now be given of the operation of the circuit construction shown in FIGS. 4 and 5. When the voltage supply circuit (FIG. 3) is turned on, the start instruction signal S is generated and transmitted through line 31. This resets the flip-flop 60 and sets the flip-flop 62 in the main functional unit 1 while in the memory unit 6 the flip-flops 60' and 62' are both reset. Accordingly, at such initial conditions only the main functional unit 1 operates to produce a unit operation signal U.

In this initial condition, if two keys, for example the [M] (for memory) and [3] keys of the keyboard 2 are successively pushed down, the key code signal corresponding to [M] is interpreted in each interpretation circuit of the functional units. In the main functional unit 1 the key code refusal signal $C_2$ is generated and in the memory unit 6 the key code demand signal $C_1$ is generated. Thus the flip-flop 60 remains in its reset state but the flip-flop 60' is set to deliver the key code suppression signal KS to the key code suppression bus line 28. The AND gate 63 of the main functional unit 1 thus becomes closed.

Since the key code receipt signal $C_3$ is generated in the memory unit 6, the flip-flops 61' and 62' are both set. Therefore the memory unit 6 generates the unit operational signal U and the successive key code signal corresponding to [3] is applied only to the memory unit 6 by the key code signal corresponding to [M]. At the same time, the instruction signal IS is delivered to the instruction control bus line 29 to prevent the generation of a unit operation signal U in the other subfunctional units such as the function generator unit 7, etc., and hence the other sub-functional units are barred from receiving the instruction signal I.

As described above, with the present invention the respective units are integrated on separate semiconductor wafers and are connected by common bus lines, such as the common key code bus line, the common key code suppression line, etc., so that the receipt of the key code signal can be controlled in each unit by the key code suppression signal appearing on the key code bus line. Since the keyboard unit 2 and the program unit 3 are common to the various units, the function of the electronic computer system can be easily changed by the addition or deletion of units to the system.

With the present invention the number of keys may be reduced from prior art systems because a larger number of key code signals can be produced. By way of example, the key [3] generally indicates the number of [3] but it produces an instruction to the memory operation if it is pushed after the key [M], for memory, is pushed. Furthermore because of the system of suppression signals even if the keyboard is erroneously operated when the automatic arithmetic operation is being carried out in accordance with a predetermined process, the erroneous operation of the keyboard does not effect the system.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An electronic computer system comprising:

A. a plurality of functional units, at least one of the functional units having means for generating an instructional signal;

B. a keyboard unit for generating a key code signal including an information signal for selecting one of the functional units;

C. a common key code bus line for receiving the key code signal from the keyboard unit and for distributing the same to each of the functional units;

D. key code interpretation means included in each of the functional units for receiving and interpreting the key code signal;

E. separate key code suppression signal generating means included in each of the functional units, the key code suppression signal generating means of one of the functional units generating a key code suppression signal to be distributed to the other functional units when said one functional unit is selected to receive a succeeding key code signal in accordance with the interpretation of the key code signal by the key code interpretation means of said one functional unit; and F. a key code suppression bus line connected in common to each of the key code suppression signal generating means for receiving the key code suppression signal from the one functional unit and for supplying the same to the rest of the functional units to bar them from operatively receiving the succeeding key code signal.

2. An electronic computer system as recited in claim 1; wherein one of the plurality of functional units is a main functional unit and another of the plurality of functional units is a memory unit.

3. An electronic computer system as recited in claim 1; wherein the plurality of functional units are made in the form of integrated circuits on separate semiconductor wafers.

4. An electronic computer system as recited in claim 1; wherein the system further comprises:

A. an arithmetic unit;

B. a common instruction bus line connected between the arithmetic unit and each of the functional units for receiving an instruction signal from the one of the functional units and for supplying the same to the arithmetic unit so that an arithmetic operation is performed therein; and C. instruction suppression signal generating means included in each of the functional units, the instruction suppression signal generating means of the one of the functional units generating an instruction suppression signal which prevents the other functional units from generating another instruction signal.

5. An electronic computer system as recited in claim 4; wherein one of the plurality of functional units is a main functional unit and another of the plurality of functional units is a memory unit.

6. An electronic computer system as recited in claim 4; wherein the system further comprises: means in at least the one functional unit for generating a data signal, a common data bus line connected beween the arithmetic unit and each of the functional units for giving and taking a data signal between the arithmetic unit and the one of the functional units.

7. An electronic computer system as recited in claim 4; wherein the plurality of functional units are respectively made in integrated circuit form on separate semiconductor wafers.

* * * * *